Patented July 31, 1923.

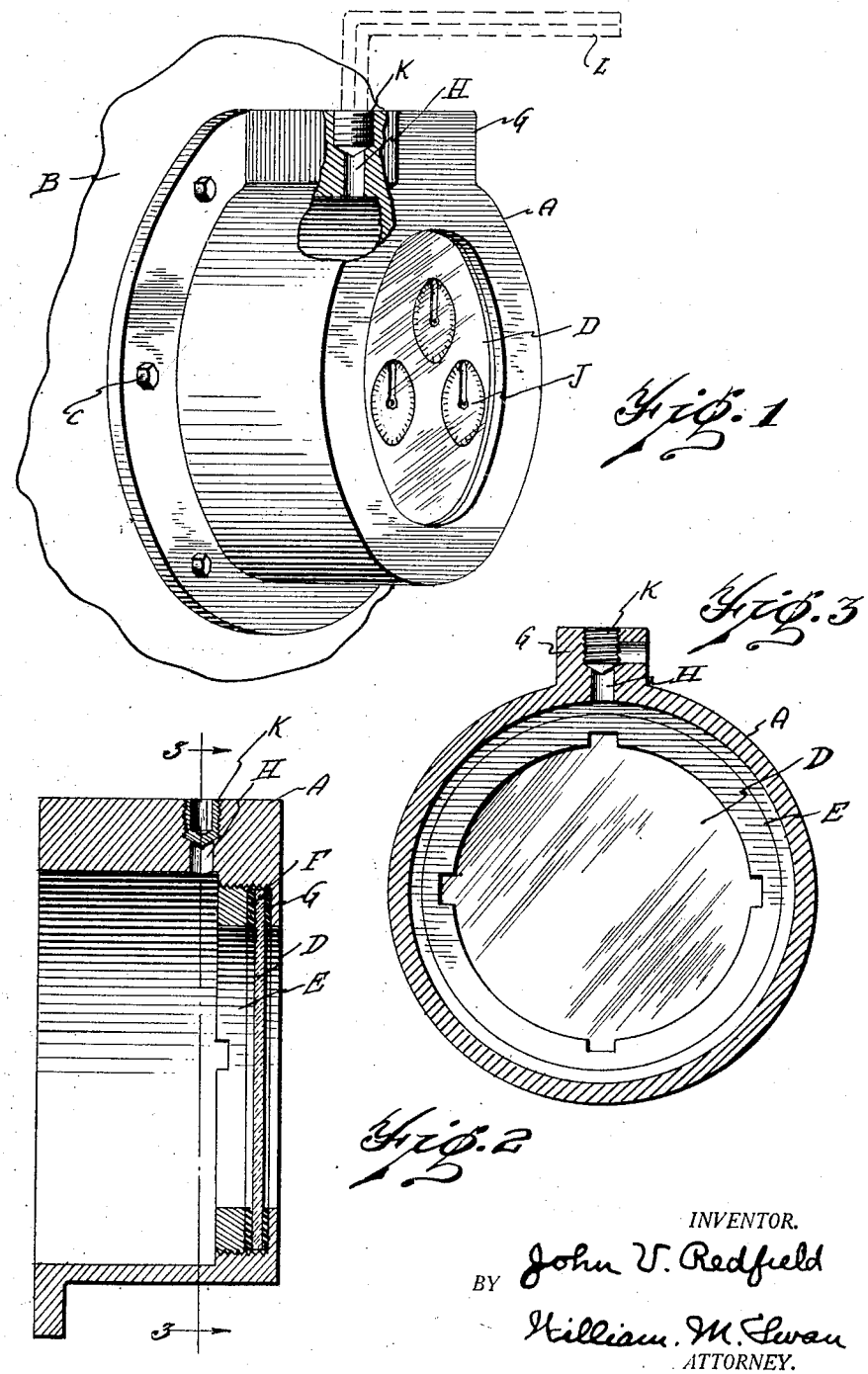

1,463,404

UNITED STATES PATENT OFFICE.

JOHN V. REDFIELD, OF GROSSE POINTE, MICHIGAN, ASSIGNOR TO CENTRAL STATION STEAM COMPANY, OF DETROIT, MICHIGAN, A CORPORATION OF MICHIGAN.

CONDENSATION-METER COUNTERHOUSING.

Application filed July 5, 1921. Serial No. 482,385.

*To all whom it may concern:*

Be it known that I, JOHN V. REDFIELD, a citizen of the United States, residing at Grosse Pointe village, county of Wayne, State of Michigan, have invented a certain new and useful Improvement in Condensation-Meter Counterhousings, and declare the following to be a full, clear, and exact description of the same, such as will enable others skilled in the art to which it pertains to make and use the same, reference being had to the accompanying drawings, which form a part of this specification.

This invention relates to meter-housings for the dials of condensation meters of the vacuum type, and has for its object an improved arrangement of parts by means of which the tendency of the glass which covers the reading dial to become fogged and nontransparent may be counteracted at any time for the relatively brief period necessary for readings to be taken, without appreciable or injurious effect on the workings of the system as a whole.

In the drawings:

Figure 1 is a perspective of my improvement construction, with a part of the shell broken away to show the valve passage in section.

Figure 2 is a side sectional elevation.

Figure 3 is a front sectional elevation, taken along the line 3—3 of Figure 2 and looking in the direction of the arrows there shown.

Condensation meters being used for measuring the condensate returns from heating systems, the water of condensation flows to the meter at a comparatively high temperature, and vapor is present in the meter case, which of course must be vacuum tight as regards its connection with the main shell portion of the meter. The outside air, in the room where the meter is located, is of course generally colder than that inside the meter, and this causes the fogging of the dial glass because of the resultant condensation of the vapor therewithin, and the reading of the meter counter behind the glass is rendered accordingly difficult. It is of course obvious from the very nature of the apparatus that the connection of the meter housing be maintained air-tight, but I have found that the admission of a relatively small quantity of air from the room for a comparatively brief period, while without serious effects upon the system as a whole, can be relied upon to clear the condensation of the vapor from the glass long enough for the desired readings to be taken.

To this end, I provide a vacuum-tight counter-housing A, attached to the shell of the meter housing B, by means of screws or bolts C and having a glass D closing the open front thereof and rendered tight by means of the gaskets F and G, the inner one being held in place by means of the ring E. Through the ribbed portion G of the housing I bore an L-shaped passage H, one end of which communicates with the outer air and the inner end of which opens into the space between the glass D and the dial surface J. This passage H is normally kept closed as tight as any other part of the housing, by means of the threaded valve plug K, but when the clearance of the inner surface of the glass is desired for purposes of reading the dials, this valve may be raised from its seat by any desired means, such for example as the key L. The opening of the L-shaped passage H thus permits the inrush of air from the room into the enclosed dial space, and consequently cleans the glass from the condensation deposit. As soon as the reading has been taken, the valve may be closed, causing the resumption of the vacuum condition and of the now not objectionable fogging of the glass, without any appreciable deleterious effect upon the vacuum system as a whole. It is of course obvious that the exact type of valve here illustrated need not be used, though it has been my experience that it is well to avoid any but a solid, positively actuated valve, as contrasted, for example, with a spring-held valve.

What I claim is:

1. The combination with a condensation meter of a vacuum system, of an auxiliary casing having a transparent wall and provided with means for securing it to the meter casing in air-tight connection therewith over the indicating means thereof with its interior in communication with the vapor system, and means for temporarily connecting the interior of the auxiliary casing with the outside atmosphere to permit the outside atmosphere to clear the transparent wall of the auxiliary casing for taking a reading of the indicating means.

2. The combination with a condensation meter of a vacuum system, of an auxiliary casing having a transparent wall at its outer end and provided at its inner end with a flange for securing the auxiliary casing in air-tight connection to the vapor meter over the indicating means thereof with the interior of the auxiliary casing in communication with the vapor system, said auxiliary casing being provided with an exterior rib having an opening communicating with the interior of the auxiliary casing and provided with a valve seat, said rib being also provided with a lateral branch extending from the valve seat to the exterior for admitting atmospheric air to the interior of the auxiliary casing to clear the transparent wall for taking a reading of the meter, and a manually operable valve mounted in the opening of the said rib and cooperating with the valve seat for controlling the admission of air through the lateral branch.

In testimony whereof, I sign this specification in the presence of two witnesses.

JOHN V. REDFIELD.

Witnesses:
W. GORDON BRYANT,
WILLIAM M. SWAN.